April 30, 1957  C. A. DEAN  2,790,625
UNDER-REAMERS

Filed Dec. 12, 1950  2 Sheets-Sheet 1

Inventor
CHARLES A. DEAN,

By *J. Howard Flint*

Attorney

April 30, 1957  C. A. DEAN  2,790,625
UNDER-REAMERS

Filed Dec. 12, 1950  2 Sheets-Sheet 2

Inventor
CHARLES A. DEAN,

By  *J. Howard Flint*

Attorney

United States Patent Office 2,790,625
Patented Apr. 30, 1957

2,790,625

UNDER-REAMERS

Charles A. Dean, Los Angeles, Calif.

Application December 12, 1950, Serial No. 200,425

6 Claims. (Cl. 255—76)

This invention relates to earth-boring drills, and particularly to improvements in under-reamer drills. Such drills operate at some intermediate depth of a bore.

An under-reamer may at times be kept in inactive position but it should be ready at any time to ream the bore walls. The reamer may be required to enlarge the bore at some intermediate point where a casing may have to be separated or even where no casing has been placed. This invention deals with means to obtain considerable flexibility in use of an under-reamer and deals also with locking means to keep the reamer inactive when so desired whether in the well or out of it, and whether in casing or not.

An under-reamer must operate under various conditions. As one example, the bore being drilled may curve considerably from a straight line. Sometimes this is brought about intentionally in order to explore or to tap strata well to the side of the drill rig. At other times sidewise wandering of the drill is unintentional. Whereever the bore is curved the upper side is likely to become grooved as the drill string is pulled back and forth. Finally the friction at this groove becomes so great that the bore must be cut larger at the curve. Other requirements will be evident to those skilled in this art.

For flexible operation, the reamer must operate positively, despite severe drilling conditions. The driving means for the reamers must be strong and adequate for differing kinds of earth formation. The operating means must be kept clear of debris, particularly clear from accumulations of the drilling mud that flows through the drill stem. Such mud is heavy and its sediment continually tends to clog moving elements in a drill. A suitable reamer, moreover must be locked in closed position when not cutting and so locked regardless of the presence or absence of casing. The locking means must be simple, for both positiveness of operation and requirements of manufacture. The locking means should be easy to lock and to unlock repeatedly without need to withdraw the reamer from the well bore, yet such means must not interfere with normal drilling operations when the reamer is idle. The under-reamer of this invention is intended to operate positively under such varied requirements. It is intended to be driven against earth formations and bore blockages of any sort, and intended to be locked easily whether within a pipe or not and yet to be clear for reaming as soon as released.

The nature and usefulness of this invention will be apparent from the accompanying drawings of a preferred form of the invention and from the following illustrative description thereof.

Figure 1:
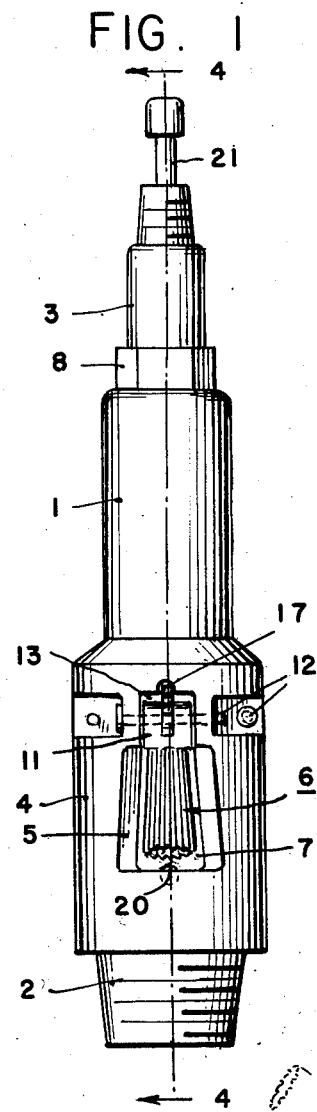
Fig. 1 is a longitudinal perspective view of the reamer with cutters folded to inactive position.

This invention will be explained with particular reference to the form and operation of the embodiment shown in the drawings.

Advantages of this invention broadly are attained by a body to house reamers, with a rotatable pipe connected to the reamers and telescoping into the body. The pipe serves many purposes. It is adapted to rotate the body, to aid in elevating or in lowering the reamers, to lock the reamers to inactive position, and to convey drilling mud through the body whether the reamers be in active or inactive position. More particularly, as shown, the body contains openings through its walls to house reamer cutters and also to seat a lock. The pipe telescoping into the top is keyed to rotate the body. The pipe extends into the body to close the wall openings back of the reamers, to hold means to raise and to lower the cutters and to keep them clear of debris. The pipe carries a lock keeper to hold the body and reamers in lowered position when inactive and also carries a spring to support the body and reamers in upper position when active. The pipe is clear throughout and is adapted to receive a latch from above to lodge against the lock keeper but permits withdrawing the latch from locking position. The arrangement of parts facilitates opening the cutters for operation at any position of the under-reamer.

Referring more particularly to the drawing, a reamer body 1, also termed an outer reamer housing is shown having its lower end 2 threaded to screw into the pipe of a rotary drill string. Telescoping into the upper end of body 1 is an elongate member 3 also termed an inner barrel. This is threaded at its upper end so as to screw into the pipe of a drill string. The body and member 3 are connected by means to be described. Thus the entire reamer may be inserted into a drill string to act as an intermediate part thereof. Moreover, this reamer may be pulled into such well casing as is normally used in earth drilling; and it may be separated from the lower part of the drill string.

The lower part of body, which is deisgnated by the numeral 4, is somewhat enlarged due chiefly to thick walls. This body contains openings 5 through its walls, each to house a reamer cutter 6. In the drawings are shown three such reamers equally spaced around the cylindrical body. The telescoping inner member 3 extends into the body 1 sufficiently to present a wall or curtain 7 over the inner face of openings 5 in the body 4. Since inner member 3 telescopes or moves longitudinally within the casing, it provides an inner wall 7 of the reamer housing that is movable up and down.

The inner member 3 serves as means to drive or rotate body 1. In the drawings requisite inter-connection between the two for this rotation is shown as an angular enlargement or fixed nut 8 forming an upper part of the member 3. This fits into a complementary angular opening forming the top of body 1. Thus, as inner member 3 is rotated, the body 1 is rotated thereby. Nevertheless relative sliding or longitudinal movement can occur readily with this type of drive.

The reamers 6 housed in openings 5 in the walls of body 4 are connected both to the body and to the inner movable wall 7 of the driving member 3. Thus the reamers are driven as a whole around the bore and also are driven to or from the body.

Control and cutting effectiveness of the reamers 6 result from their mounting and structure.

Each reamer 6 is composed of a cylindrical or conical cutter portion 9 mounted to rotate on a pin 10. Pin 10 is mounted in a reamer head 11. This reamer head is pivotally mounted on a cross shaft or axle 12. Thus the reamer as a whole can swing vertically about its axle 12 to a limited extent, preferably not more than 115°.

The reamer 6 is mounted with its head 11 fitting into an upper recess 13 of opening 5 within the walls of body 4. This is accomplished by providing holes transversely or as chords through the body walls into the upper recess 13 of opening 5. Thus, as reamer head 11 is fitted into the recess, the cross shaft or pin 12 can be inserted through the head. The pin ends rest in the body walls. On this pin reamer 6 pivots from and to the casing; and, so, as in the drawings, can raise and lower the rotatable cutter portion of the reamer. Moreover, this structure is sturdy to rotate the reamers as a whole about the bore and, with this type of rotatable cutter, to rotate the reamers simultaneously about their individual axes. This is due to reamer head 11 being mounted to swing with but small clearance in the relatively small upper recess 13. Thus axle play is minimized as well as is accumulation of debris. This is particularly important to the means of operation of this invention.

With this insertable pin and axle construction and simple geared connection of the cutters, it is feasible to insert cutters that differ in length one from another. Similarly, cutters of different shapes and forms may be substituted as desired, within the limits of the housing recess.

In mounting individual reamers, this invention provides also for their cutting a bore to full diameter of the reamer group when desired. At such times it utilizes end cutters of the reamers without deteriorating the cutters from side drag of the reamer. Observation shows that as a reamer is driven around the walls of a bore being enlarged, with the reamer swung well out from the casing, the outer end of the reamer is dragged across the earth or stone wall of the bore. This end face, with the cutting edges that it contains, consequently would become dulled. It may even be defaced to such extent that the reamer tends to set or stop in one position rather than rotate freely on its spindle. Such stoppage of the reamer would tend further to deface one side of the reamer. This would be the upper cutting edges illustrated in the drawings.

Figure 2:
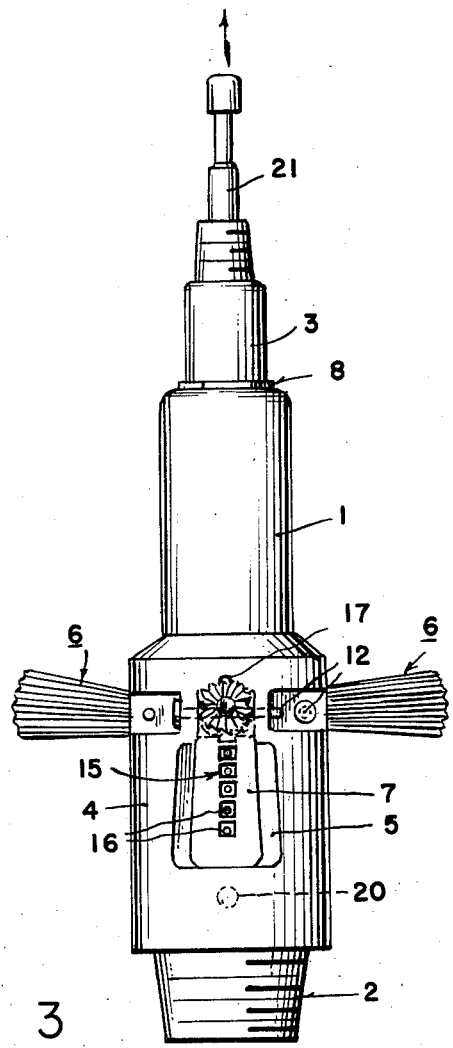
Fig. 2 is a similar view with the cutters extended to full reaming position.
Figure 3:
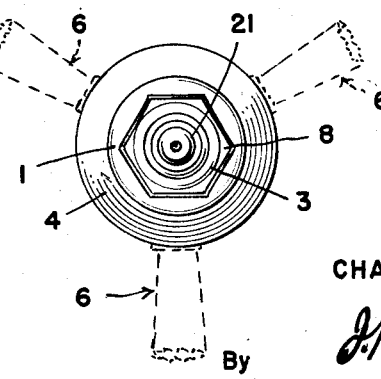
Fig. 3 is a plan view of the reamer with cutters extended.
Figure 4A:
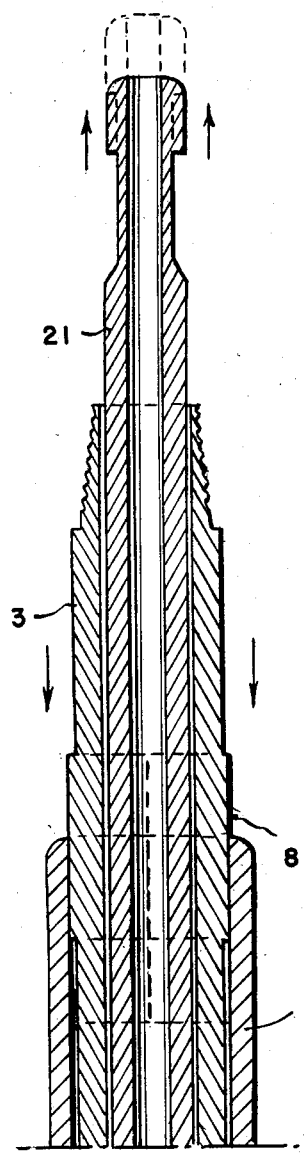
Fig. 4A is a vertical section through the upper part of the reamer, along line 4—4 of Fig. 1.
Figure 4B:
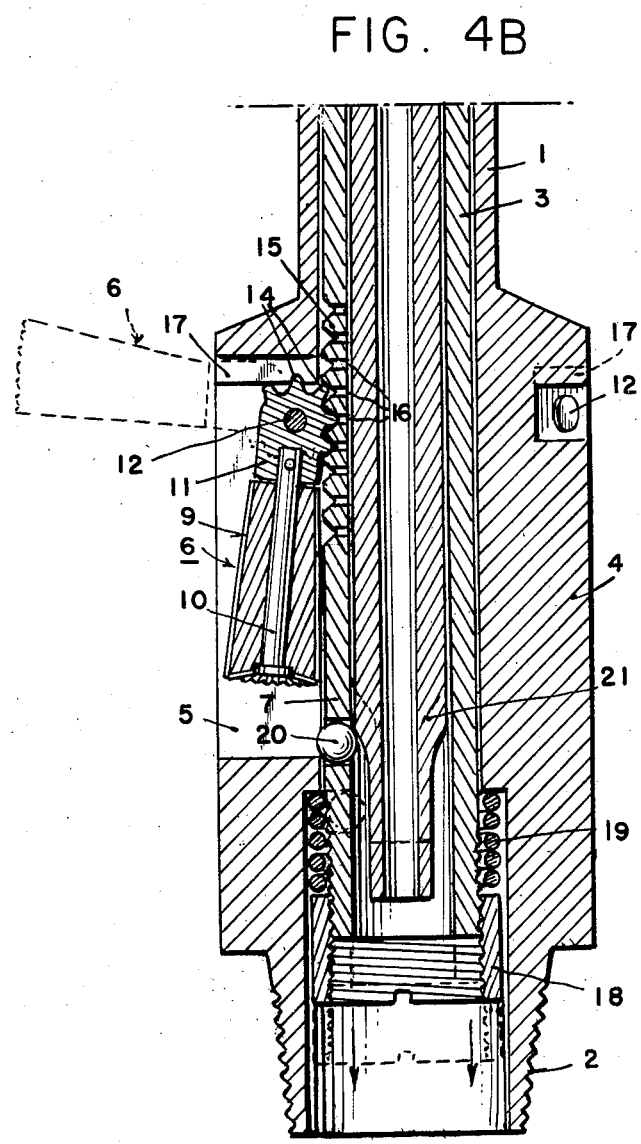
Fig. 4B is a vertical section through the lower part of the reamer, along line 4—4 of Fig. 1.

To overcome these tendencies to wear the reamer unevenly, reamers 6 are mounted in the wall recess 5 so as to tilt upwardly more than 90 degrees, preferably to approximately 115 degrees from the casing. Thus at the outer range of reaming the wall engages the outer bottom edge or corner of reamers 6 and leaves the opposite and oppositely-moving edges of the reamers clear in the reamed bore. This tends to maintain rotation of the reamer on its spindle 10 and to maintain even wear on the reamer cutting edges. Otherwise, edges at the bottom of the reamers would rotate into debris below the reamers and so tend to clog. This upward range of swing is brought about by fitting the reamer head 11 into its housing recess so that the upper surface of the reamer head fits up against the upper wall of the recess, leaving the rotary cutter portion outside the casing 4. This is illustrated in Figs. 2 and 4B. A further advantage of these broad surface abutments as shown is that the mechanical thrusts of the tool body against the extended reamers are taken largely by the reamer head, both upwardly and sidewise.

The reamers are swung to and from cutting positions by the movable inner housing wall 7 of the reamer housing and its connection with telescoping inner member 3. The connecting means shown is a rack and pinion engagement. Pinion gear teeth 14 are formed in the head 11 of each cutter and complementary rack teeth 15 are formed in wall 7. Advantageously these rack teeth may be formed by cutting a strip of angular grooves in wall 7 where they will engage pinion teeth 14. This has the advantage of simplicity and of maintenance of position during use by reason of the keyed and rugged connection of wall 7 and inner member 3 with the top of body 1. It is clear that as body 4 moves upwardly the cutter meshed with wall 7 is extended upwardly and outwardly for cutting the surrounding earth wall, particularly the wall or debris above the cutter.

A further advantage of inner curtain 7 across reamer housing 5 lies in its minimizing cutting mud in the reamers when the reamers are down. Such mud tends to settle around the reamers and slow their movement. The movable housing wall 7 not only protects the movable parts of the reamers, but it provides positive means to clear from the rack and pinion as well as from the reamer cutters such debris as may accumulate. The particular importance of this feature will become apparent with further explanation of this under-reamer. Means to clear mud from the reamers comprise openings 16 through the wall 7 to direct the usual drilling fluid itself from inside the body against the reamers. Velocity imparted to the fluid by such orifices keeps the reamers freely movable. It will be evident that position, number, direction and extent of such orifices may be varied, but their effectiveness is increased where the wall 7 is of substantial thickness, as it is where this wall functions also to drive the reamers out against the bore walls. In the drawings, orifices 16 are shown as being drilled simply through the rack teeth 15 grooved in wall 7.

With respect to housing and mounting reamers 6, this invention takes advantage of the body wall as a stop to relieve thrusts and to limit upward swing of the reamers. As described, this involves mounting the reamer head 10 substantially up against the housing ceiling. Such close mounting is furthered by providing a groove 17 in the housing ceiling into which pinion teeth 14 may turn when the reamer is housed in downward position. This substantially protects these teeth when the reamer is inactive and when unprotected by orifices 16, as will be explained. Consequently, the reamer and its associated operating means remain clear and free to move when required.

It will be apparent that the structure of inner telescopically mounted member 3, by which movable housing curtain 7 is actuated, may be of various forms. The form shown in the drawings is simple of manufacture and adds certain functions in operation. As shown, this inner member 3 is a tube having its upper end threaded and also keyed telescopically to casing 1. Tube 3 extends down to below the reamer housing. This lower portion of the inner tube 3 serves additional functions.

The inner tube 3 serves to support the reamers and their housing as well as to rotate the reamers and also to extend them to cutting position. As shown in Fig. 4B, the lower end of the tube 3 is threaded to receive a collar 18. Upon this collar is supported a compression coil spring 19 which encircles tube 3 and bears upwardly against a bottom shoulder of reamer housing 4. This assembly is contained in an enlargement of the space within the bottom of body 1. Hence, collar 18 can be reached from below the body. The bottom of this collar is grooved or otherwise adapted to be turned, as with a suitable wrench, and thus adjusted to regulate the compression of spring 19. By this means the pressure of reamers 6 against the bore wall is regulated. The weight of body 1 tends to keep the reamers folded down in their housing in the walls, but when the resilient means 19 is free to act, the reamers are raised. The reamers snap up to drilling position according to regulation of the spring force by means of collar 18. Compression spring 19 tends to rotate with the upper drill string and supports the body 1 and holds the individual cutters out against the bore wall.

The tendency of spring 19 to cooperate with inner tube 3 is of further use in this invention to actuate locking means for the reamers. Tube 3 functions to house a lock keeper 20. As shown in Fig. 4B, a spherical keeper is mounted on inner tubular member 3, being contained in a hole through the wall of tube 3 at a convenient place for the keeper, having to and fro play, to move out to engage a complementary shoulder in the wall of body or reamer housing 1. This locks inner tubular member 3 and outer reamer housing 1 together, and reamers 6 down in inward position in housing 1. The hole opening at the inner wall of tube 3 is of less diameter than ball 20, so that ball 20 can project into the bore of tube 3 but not be lost therethrough. In assembling the reamer, this ball can be inserted from outside tube 3 but in operation the ball is confined by the upper limit of play of tube 3 that is imposed by nesting reamers 6 against tube 3 when the reamers are housed in inactive position. In this position the tube is at its upper limit and keeper 20 is free to roll outwardly sufficiently to wedge over a shoulder in casing 1. In Fig. 4B this engagement is the shoulder at the bottom of housing opening 5, but other places may serve likewise. Any play between body 1 and tube 3 that might disturb this locking position of the keeper is minimized by the compression spring 19 which tends to force the body 1 up relatively and the tube 3 down to wedge keeper 20. It is evident that other forms of latch may be used likewise, though the particular form described operates well in combination with the assembly shown.

Locking of the reamers in closed position is assured further by utilizing inner tube 3 also as guide for a latch 21. As shown, this comprises a wedge intended to drop within tube 3 to rest or bear against ball keeper 20 and hold the ball out in locking position. This latch 21 is intended to be lifted to free the ball 20. As shown this is accomplished by forming the latch as a gradual enlargement of a tube fitting within telescoping tube 3 and projecting from the top of the reamer. At the top, this latch tube 21 carries a grab head or other means to be engaged by conventional lifting means. Lifting the latch 21 unlocks tube 3 so that casing 1 can move up relatively and reamers 6 can pivot outwardly. When tube 3 moves down within the casing 1, ball 20 is carried down and moves inwardly within the wall of tube 3. Thus ball 20 is retained within casing 1, projecting into the bore of tube 3 ready for subsequent or relocking engagement with the curved latch 21. In this position with the latch withdrawn, tube 3 carries drilling mud through its bore. However, when the latch tube is down inside tube 3, an open bore within that tube carries drilling mud to the drill string below.

The reamers may be unlatched and relatched while within a well. It is clear that the outer body and the reamers in its walls are biased relatively upward by the spring. Nevertheless the weight of body and reamers makes it easy to push them down. In brief, these elements substantially float, depending on the adjustment given the spring. Consequently, as the drill string (that is the body here) is pulled upwardly, contact of even one reamer against a side wall is sufficient to push each reamer arm down to pivot into its housing in the body wall. This occurs as well where a deflection of the bore exists. Also, it must be remembered, the bore may not necessarily be reamed out its entire length, but special pockets or places for packing may be reamed below a normal bore. Of course, it is clear that once the reamers are down (see Fig. 4B) the body shoulder is down so that ball latch 20 can lock thereover and be held locked when mandrel 21 is dropped back into position. The reamer does not unlock merely by dropping the reamer body below the casing nor depend on withdrawal up into a casing for relocking to inactive position. Moreover, the reamers when unlocked spring out into active position; this may occur at any desired place in the bore and occur with a springiness that is controlled. These actions can take place repeatedly, for unlocking does not depend on compressing a spring. Locking and unlocking occur without being affected by the presence or absence of drilling fluid, or indeed occur even with drilling fluid reversal and flowing upward in the drill string.

It is evident from this description that this under-reamer can function as part of a drill string whether housed within a well casing or out of the casing. The reamer may be kept locked to inactive position or readily be unlocked in either case. When unlocked, the reamer may operate to enlarge or to straighten a bore, whether the lower part of the drill string is attached or is separated from the reamer. No interference from mud, sediment or debris is encountered nor is operation of the reamers dependent on fluid within the casing. If such fluid be present, the reamers are kept clear so as to operate quickly and freely. The balance or upward thrust, or downward thrust, as the case may be, of the reamers may be regulated. Also, the diameter to which a bore will be enlarged by given reamers may be adjusted by this balance. The reamers may be operated upwardly against a deflected bore wall or may be operated downwardly according to requirements.

It will be evident that variation and equivalent construction fall within the novel features of this invention set forth in the accompanying claims. However, in accordance with the patent statutes, this invention has been explained, and the principles thereof and their best mode of application described, to enable those skilled in the art to make and use this invention.

What is claimed is:

1. An undercutter reamer for earth boring comprising a body portion and an inner pipe portion telescopically fitted therein and locked to the body for rotation thereof, the body and pipe being threaded at their open ends to screw into the pipe string of a rotary drill, openings through the body walls and rotatable reamers pivotally mounted in the openings, rack and pinion connection between the pipe and the reamers to pivot the reamers outwardly on raising of the body, and a lock between the body and the pipe comprising a recess through the inner pipe wall to house a keeper and a surface of the body wall opposite the recess formed to engage the keeper, the lock being located to hold the pipe in upper position, said keeper being adapted to move back and forth from the body through the pipe wall.

2. An undercutter reamer as defined in claim 1 in which the lock recess is located in the pipe to be opposite the bottoms of said openings in said body when the pipe is in upper position, the recess having an outer opening positioned to present a ball keeper of slightly larger diameter than the wall of the pipe in slight overlap with the bottoms of said openings in said body and having a smaller inner opening for permitting said keeper ball inside the pipe to extend into the path of a follower within the pipe.

3. An undercutter reamer comprising a hollow body, reamers comprising a hollow body, reamers pivotally housed in the walls thereof, an inner tube telescopically keyed within the body for mutual rotation, gear means interconnecting the tube and the reamers whereby longitudinal movement of the tube elevates the reamers, and a reamer lock comprising a keeper housing through the wall of the innertube, in the wall of the body a space complementary to said keeper housing in the tube, a ball in the opening forming a keeper, the ball keeper projecting slightly beyond the outer periphery of the tube to engage the body within said complementary space, and a latch adapted to fall through the tube and wedge the keeper against the body to prevent longitudinal movement of the tube and pivoting of the reamers.

4. An undercutter reamer comprising a hollow body, reamers pivotally housed in the walls thereof, an inner tube telescopically keyed within the body for mutual rotation, gear means interconnecting the tube and the reamers whereby lowering of the tube elevates the reamers, and a reamer lock comprising a keeper housing through the wall of the inner tube, in the wall of the body a space complementary to said keeper housing in the tube, a ball in the opening forming a keeper, the ball keeper projecting slightly beyond the outer periphery of the tube to engage the body within said complementary space, and a latch adapted to fall through the tube and wedge the keeper against the casing to prevent longitudinal movement of the tube and pivoting of the reamers, the tube at its bottom supporting a compression spring between it and the casing, whereby the spring tends to lift the body and open the reamers on release of the lock.

5. In an earth-drill under-reamer having an inner barrel open throughout and an outer reamer housing telescopically connected therewith, and reamers having reamer heads mounted in the housing and rotatably connected to the inner barrel to move in or out from the housing on relative vertical motion of the barrel, the improvement comprising resilient means mounted between the reamer housing and the inner barrel biasing the reamer housing relatively upward and the reamer heads outward, means to lock and relock the reamer heads out of reaming position comprising keeper means mounted in openings in the wall of the barrel to move back and forth in the wall and extendable out beyond the wall of the barrel to engage a shoulder on the housing when the reamer heads are in inward position within the housing, and latch means movable up and down in the barrel and having wedging contact outward against the keeper means when the reamer heads are in said inward position.

6. In an undercutter earth-reamer having a tubular body with individual reamers pivoted therein and a vertically movable tubular member within the body with reamer-engaging means on the inner tubular member to swing the reamers in or out upon relative vertical movement of the tubular member, resilient means mounted between the body and the inner tubular member and adapted at all times to bias said inner tubular member down and the reamers outwardly, said tubular inner member being adapted to compress the resilient means on inward movement of the reamers, and means to lock and relock the inner member and said outer body together comprising keeper means mounted on the inner tubular member with to and fro play and adapted to lock said tubular member and body together at inward position of the reamers, and latch means within the inner member adapted to bear against the keeper in said locked position, said latch means being movable relatively to said inner tubular member to release the keeper.

References Cited in the file of this patent

UNITED STATES PATENTS

| | | |
|---|---|---|
| 631,423 | Fauck | Aug. 22, 1899 |
| 1,091,502 | Gearing | Mar. 31, 1914 |
| 1,478,306 | Sweetman | Dec. 18, 1923 |
| 1,489,674 | Schellenbach | Apr. 8, 1924 |
| 1,774,764 | Santiago | Sept. 2, 1930 |
| 2,049,450 | Johnson | Aug. 4, 1936 |
| 2,409,811 | Taylor et al. | Oct. 22, 1946 |